(12) United States Patent
Song et al.

(10) Patent No.: US 10,591,295 B2
(45) Date of Patent: Mar. 17, 2020

(54) TILT MEASUREMENT METHOD FOR RTK MEASURING RECEIVER

(71) Applicant: SHANGHAI HUACE NAVIGATION TECHNOLOGY LTD, Shanghai (CN)

(72) Inventors: Rui Song, Shanghai (CN); Jin Zhou, Shanghai (CN); Benyin Yuan, Shanghai (CN); Jiejun Wang, Shanghai (CN); Dongguo Piao, Shanghai (CN)

(73) Assignee: SHANGHAI HUACE NAVIGATION TECHNOLOGY LTD, Shanghai (CN)

( * ) Notice: Subject to any disclaimer, the term of this patent is extended or adjusted under 35 U.S.C. 154(b) by 0 days.

(21) Appl. No.: 16/315,168

(22) PCT Filed: Jun. 20, 2017

(86) PCT No.: PCT/CN2017/089091
§ 371 (c)(1),
(2) Date: Jan. 4, 2019

(87) PCT Pub. No.: WO2018/129865
PCT Pub. Date: Jul. 19, 2018

(65) Prior Publication Data
US 2019/0310083 A1    Oct. 10, 2019

(30) Foreign Application Priority Data

Jan. 10, 2017 (CN) .......................... 2017 1 0016455

(51) Int. Cl.
*G01C 9/02* (2006.01)
*G01C 9/00* (2006.01)
(Continued)

(52) U.S. Cl.
CPC ................. *G01C 9/02* (2013.01); *G01C 9/00* (2013.01); *G01S 19/40* (2013.01); *G01S 19/43* (2013.01); *G06F 17/16* (2013.01)

(58) Field of Classification Search
CPC ................................. G01C 9/02; G01S 19/40
See application file for complete search history.

(56) References Cited

U.S. PATENT DOCUMENTS

| 7,409,312 B2 * | 8/2008 | Conner ................ G01C 15/002 702/159 |
| 2003/0058164 A1 * | 3/2003 | Zhdanov ................ G01C 15/00 342/357.32 |

(Continued)

FOREIGN PATENT DOCUMENTS

| CN | 102338632 A | 2/2012 |
| CN | 103439727 A | 12/2013 |

(Continued)

*Primary Examiner* — Lisa E Peters
(74) *Attorney, Agent, or Firm* — Bayramoglu Law Office LLC (57) ABSTRACT

A tilt measurement method for an RTK measuring receiver includes the following steps: step S1: fixing the bottom of a centering rod and performing a measurement after an inclination and shake; step S2: obtaining a measurement point sequence, a measurement point tilt sequence, a length of the centering rod, and a height of an antenna phase center based on the measurement; step S3: obtaining a positioning quality threshold and a geodetic coordinate of the to-be-measured point based on values obtained from the measurement; and step S4: determining whether the positioning quality threshold meets a requirement or not to decide whether to finish the measurement or not. In the method, the position of a to-be-measured point is calculated according to the position and the tilt angle of the antenna phase center of the receiver, and the length of the centering rod etc. during multiple tilt measurements.

13 Claims, 4 Drawing Sheets

(51) Int. Cl.
*G01S 19/40* (2010.01)
*G01S 19/43* (2010.01)
*G06F 17/16* (2006.01)

(56) References Cited

U.S. PATENT DOCUMENTS

| | | | | |
|---|---|---|---|---|
| 2008/0036646 A1* | 2/2008 | Green | ............... | G01C 15/00 342/118 |
| 2008/0049105 A1 | 2/2008 | Shimizu et al. | | |
| 2009/0267827 A1* | 10/2009 | Allison | ............... | G01C 15/00 342/357.27 |
| 2016/0178369 A1 | 6/2016 | Ashjaee | | |

FOREIGN PATENT DOCUMENTS

| | | |
|---|---|---|
| CN | 104215229 A | 12/2014 |
| CN | 105424013 A | 3/2016 |
| CN | 106291609 A | 1/2017 |
| CN | 106595583 A | 4/2017 |

* cited by examiner

TILT MEASUREMENT METHOD FOR RTK MEASURING RECEIVER

CROSS REFERENCE TO RELATED APPLICATIONS

This application is the national phase entry of International Application No. PCT/CN2017/089091, filed on Jun. 20, 2017, which is based upon and claims priority to Chinese Patent Application No. 201710016455.6, filed on Jan. 10, 2017, the entire contents of which are incorporated herein by reference.

TECHNICAL FIELD

The present invention relates to the field of Real Time Kinematic (RTK) measurement technology, in particular to a tilt measurement method for an RTK measuring receiver.

BACKGROUND

In the RTK measurements, a centering rod of a rover should be vertically placed, and then the position coordinate of the to-be-measured point on the ground is calculated according to the position of the phase center of the antenna of the Global Navigation Satellite System (GNSS) receiver and the distance from the phase center to the ground. However, in the practical measurement operation, due to the impacts of the topographic conditions and the restrictions of the instrument itself, the centering rod of the rover cannot be vertically placed in many measurement points, and an inclination is usually required, thereby causing a complicated measurement process and a large measurement error.

SUMMARY

In order to eliminate the above-mentioned deficiencies, the present invention provides a tilt measurement method for an RTK measuring receiver, which calculates the position of a to-be-measured point according to the position and the tilt angle of the antenna phase center of a receiver, and the length of the centering rod etc. during multiple tilt measurements. For a centimeter-level RTK, a position calculation with centimeter-level accuracy can be achieved when the amount of observation values is sufficient.

The present invention provides a tilt measurement method for an RTK measuring receiver, which includes the following steps:

Step S1: fixing the bottom of a centering rod and performing a measurement after an inclination and shake;

Step S2: obtaining a measurement point sequence, a measurement point tilt sequence, a length of the centering rod, and a height of an antenna phase center based on the measurement;

Step S3: obtaining a positioning quality threshold and a geodetic coordinate of the to-be-measured point based on values obtained from the measurement;

Step S4: determining whether the positioning quality threshold meets a requirement or not to decide whether to finish the measurement or not.

In the above-mentioned method, wherein the step of fixing the bottom of the centering rod and performing a measurement after an inclination and shake includes:

during the measurement, keeping the length of the centering rod unchanged while in use, and keeping the bottom of the centering rod fixed.

According to the above-mentioned method, the step of obtaining a measurement point sequence, a measurement point tilt sequence, a length of the centering rod, and a height of an antenna phase center based on the measurement includes:

observing and obtaining a geodetic coordinate $(B_i, L_i, H_i)$ of an observation point and a measurement tilt angle $\theta_i$;

converting the geodetic coordinate $(B_i, L_i, H_i)$ of the observation point into a planar coordinate $(N_i, E_i, H_i)$;

obtaining a planar coordinate $(\hat{N}_0, \hat{E}_0, \hat{H}_0)$ of the to-be-measured point on the ground based on the planar coordinate $(N_i, E_i, H_i)$, and converting the planar coordinate $(\hat{N}_0, \hat{E}_0, \hat{H}_0)$ into a geodetic coordinate $(\hat{B}_0, \hat{L}_0, \hat{H}_0)$.

According to the above-mentioned method, the step of obtaining a positioning quality threshold and a geodetic coordinate of the to-be-measured point based on values obtained from the measurement includes:

establishing a first type of observation equation according to the principle of resection based on a position coordinate of the observation point and a distance between the observation point and the to-be-measured point;

establishing a second type of observation equation according to a cosine relationship of a tilt angle of a height difference and a distance between the observation point and the to-be-measured point.

According to the above-mentioned method, the step of determining whether the positioning quality threshold meets the requirement of deciding whether or not to finish the measurement includes:

determining whether the positioning quality threshold meets the requirement, if the requirement is not satisfied, performing step S1 through step S3; if the requirement is satisfied, then finishing the measurement.

According to the above-mentioned method, wherein the step of obtaining a planar coordinate $(\hat{N}_0, \hat{E}_0, \hat{H}_0)$ of the to-be-measured point on the ground based on the planar coordinate $(N_i, E_i, H_i)$, and converting the planar coordinate $(\hat{N}_0, \hat{E}_0, \hat{H}_0)$ into a geodetic coordinate $(\hat{B}_0, \hat{L}_0, \hat{H}_0)$ includes:

establishing an observation equation and performing an indirect adjustment;

performing a robust estimation according to the residual of the observation values after the indirect adjustment and calculating the planar coordinate $(\hat{N}_0, \hat{E}_0, \hat{H}_0)$ of the to-be-measured point on the ground.

According to the above-mentioned method, in the step of establishing a first type of observation equation according to the principle of resection based on the position coordinate of the observation point and the distance between the observation point and the to-be-measured point, assuming that a planar coordinate of the antenna phase center of the GPS receiver is $(N_i, E_i)$ and the geodetic height is $H_i$ (wherein, i is $1, 2 \ldots, n$, n is the total number of observation points, the same below), and assuming that a planar coordinate and a geodetic height of the to-be-measured point O are $(\hat{N}_0, \hat{E}_0)$ and $\hat{H}_0$ respectively and a length from the to-be-measured point to the observation point is $\hat{L}_i$, the observation equation is expressed by the following equation:

$$\tilde{L}_i = \sqrt{(N_i - \tilde{N}_0)^2 + (E_i - \tilde{E}_0)^2 + (H_i - \tilde{H}_0)^2} \qquad (1)$$

the following equation is obtained after a linearization:

$$v_{L_i} = \frac{(N_0 - N_i)}{L_i^0} v_N + \frac{(E_0 - E_i)}{L_i^0} v_E + \frac{(H_0 - H_i)}{L_i^0} v_H - (L_i - L_i^0) \qquad (2)$$

wherein, $v_{L_i}$ is a length correction number, $(v_N, v_E, v_H)$ is a coordinate correction number of the to-be-measured point, $(N_0, E_0, H_0)$ is an approximate coordinate of the to-be-measured point, $L_i$ is a sum of the length of the centering rod and a height of the antenna, $L_i^0$ is the distance calculated from the coordinate of the observation point and the approximate coordinate of the to-be-measured point.

According to the above-mentioned method, in the step of establishing a second type of observation equation according to a cosine relationship of a tilt angle of a height difference and a distance between the observation point and the to-be-measured point, assuming that an observation tilt angle of the observation point is $\tilde{\theta}_i$, the observation equation is expressed by the following equation:

$$\tilde{L}'_i = \tilde{H}_0 - H_i \quad (3)$$

wherein $\tilde{L}'_i = -\tilde{L}_i \cos \tilde{\theta}_i$, so the following equation can be obtained after operating based on the equations:

$$v_L = v_H - (H_i - L_i \cos \theta_i - H_0) \quad (4)$$

combining the equation (2) and (4) to establish the error equation set:

$$V = BX - W, P \quad (5)$$

$$\text{wherein } X = \begin{bmatrix} v_N \\ v_E \\ v_H \end{bmatrix}; B = \begin{bmatrix} \frac{N_0-N_1}{L_1^0} & \frac{E_0-E_1}{L_1^0} & \frac{H_0-H_1}{L_1^0} \\ \frac{N_0-N_2}{L_2^0} & \frac{E_0-E_2}{L_2^0} & \frac{H_0-H_2}{L_2^0} \\ \cdots \\ \frac{N_0-N_n}{L_n^0} & \frac{E_0-E_n}{L_n^0} & \frac{H_0-H_n}{L_n^0} \\ 0 & 0 & 1 \\ 0 & 0 & 1 \\ \cdots \\ 0 & 0 & 1 \end{bmatrix};$$

$$W = \begin{bmatrix} L_1 - L_1^0 \\ L_2 - L_2^0 \\ \cdots \\ L_n - L_n^0 \\ H_1 - L_1\cos\theta_1 - H_0 \\ H_2 - L_2\cos\theta_2 - H_0 \\ \cdots \\ H_n - L_n\cos\theta_n - H_0 \end{bmatrix};$$

P is a weight matrix, which is set according to an accuracy of the observation values, if information of the accuracy of the observation values is not available, P can be set as a unit matrix.

The above-mentioned method includes the following steps: obtaining the following equation according to the weighted least square criterion:

$$\hat{X} = (B^T P B)^{-1} B^T P W \quad (6)$$

finally calculating the planar position $(\hat{N}_0, \hat{E}_0)$ of the to-be-measured point on the ground and the geodetic height $\hat{H}_0$ through a loop iteration;

$$\text{and assuming } A = \begin{bmatrix} \frac{N_0-N_1}{L_1^0} & \frac{E_0-E_1}{L_1^0} & \frac{H_0-H_1}{L_1^0} \\ \frac{N_0-N_2}{L_2^0} & \frac{E_0-E_2}{L_2^0} & \frac{H_0-H_2}{L_2^0} \\ \cdots \\ \frac{N_0-N_n}{L_n^0} & \frac{E_0-E_n}{L_n^0} & \frac{H_0-H_n}{L_n^0} \end{bmatrix}$$

wherein A is a coefficient matrix; calculating ATA to obtain a unit matrix with dimensions of 3 rows and 3 columns; and summing up the diagonal elements of the unit matrix, then calculating a square root of the summed value to obtain the quality threshold.

The present invention has the following advantages. The position of a to-be-measured point is calculated according to the position and the tilt angle of the antenna phase center of the receiver, and the length of the centering rod etc. during multiple tilt measurements. For a centimeter-level RTK, the position calculation with centimeter-level accuracy can be achieved when the amount of observation values is sufficient.

BRIEF DESCRIPTION OF THE DRAWINGS

The present invention and features, appearance, and advantages thereof will become clearer by reading the detailed description of the non-limiting embodiment with reference to the drawings below. The identical reference numerals throughout all the drawings refer to the same part. The drawings are not drawn according to specific proportions, the emphasis is the substance of the present invention.

101: centering rod, 102: antenna, 103: antenna phase center, 104: measurement point, 105: to-be-measured point, 106: receiver, 107: antenna height.

DETAILED DESCRIPTION OF THE EMBODIMENTS

In the following descriptions, numerous specific details are given for a complete understanding of the present invention. However, it is apparent to those skilled in the art that the present invention may be implemented without one or more of these details. In other examples, in order to avoid confusion with the present invention, some technical features known in the art are not described.

For a complete understanding of the present invention, detailed steps and detailed structures will be provided in the following descriptions in order to clearly illustrate the technical solution of the present invention. A preferred embodiment of the present invention is described in detail hereinafter. However, besides these detailed descriptions, the present invention may have other implementations.

Figure 1:
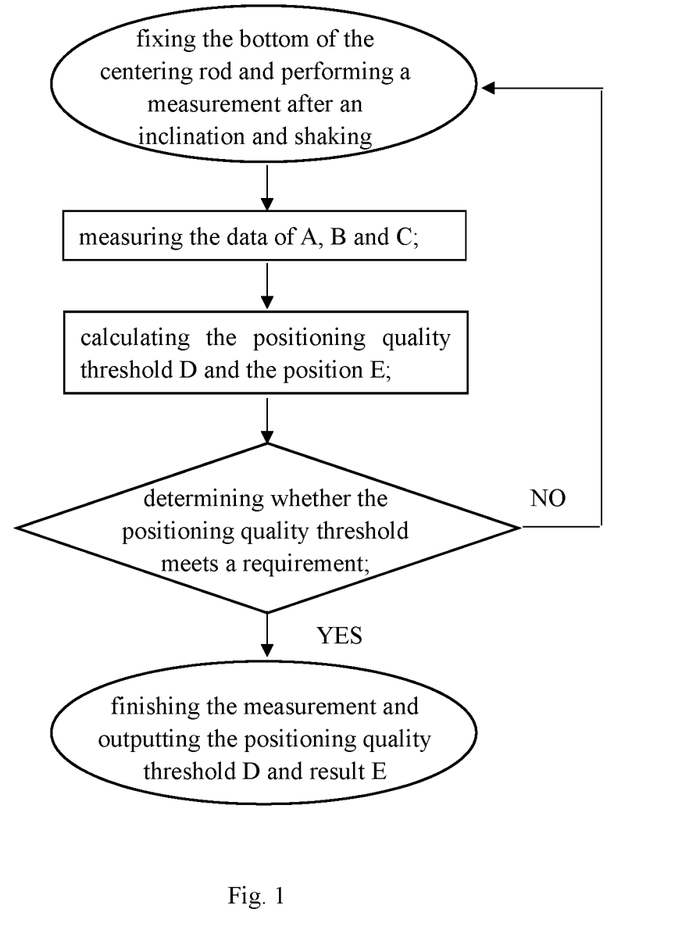
FIG. 1 is a flow chart showing the process of a tilt measurement method for an RTK measuring receiver of the present invention.
Figure 2:
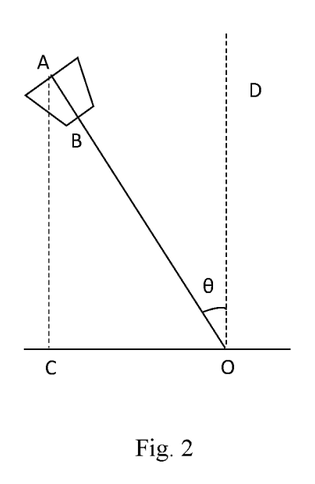
FIG. 2 is a schematic diagram of a tilt measurement method for an RTK measuring receiver of the present invention.
Figure 3:
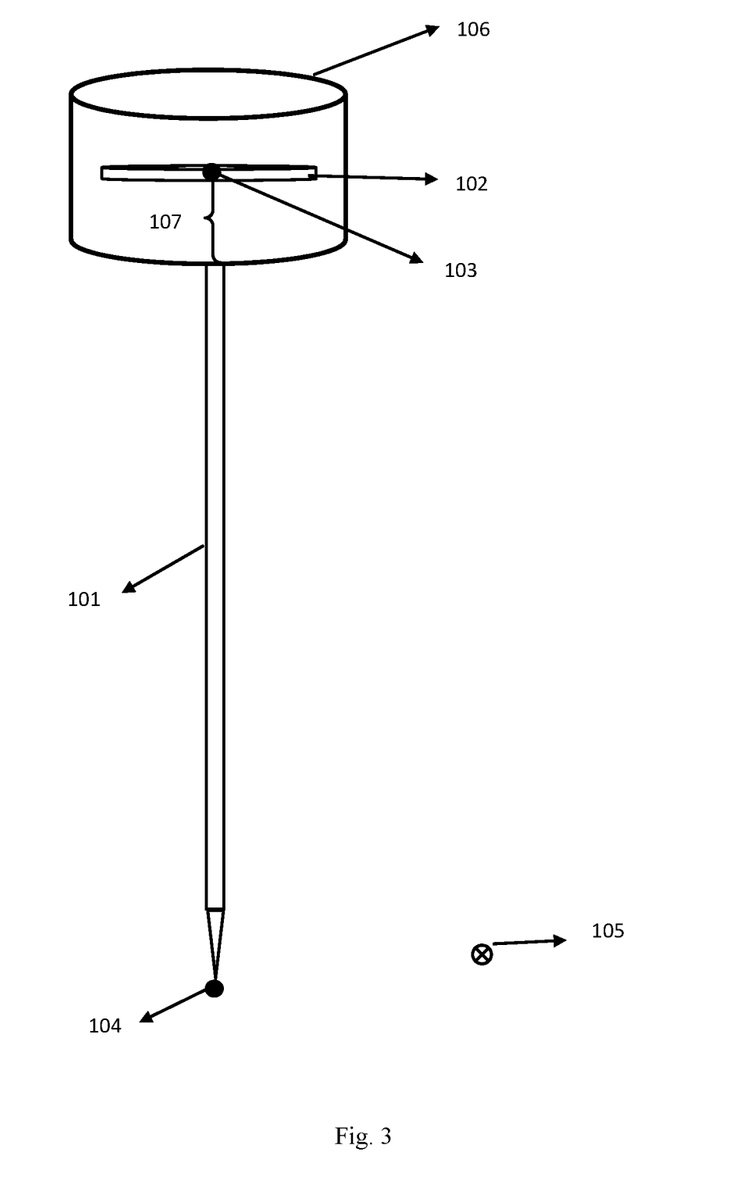
FIG. 3 is another schematic diagram of a tilt measurement method for an RTK measuring receiver of the present invention.
Figure 4:
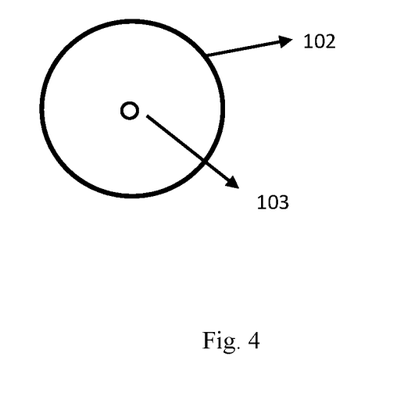
FIG. 4 is a top view of an antenna of FIG. 3.

Referring to FIG. 1 and FIG. 2, the present invention provides a tilt measurement method for an RTK measuring receiver, which includes the following steps.

Step S1: the bottom of a centering rod is fixed and a measurement is performed after an inclination and shake. During the measurement, the length of the centering rod is kept unchanged in the use, and the bottom of the centering rod is fixed. Namely, the stability of the receiver during the measurement is unrestrictive, and the receiver can be shook arbitrarily as long as the bottom is fixed.

Step S2: a measurement point sequence, a measurement point tilt sequence, a length of the centering rod, and a height of an antenna phase center are obtained based on the measurement. Specifically, referring to A, B, and C shown in FIG. 1, A is the measurement point sequence, which includes all observation points recorded from the start of the measurement to the end of the measurement in chronological sequence. Each point has its own positioning information, and the information is the geodetic coordinate of the actual measured point (the antenna phase center). The geodetic coordinate sequentially includes the geodetic latitude B, the geodetic longitude L, and the geodetic height H. The unit of B and L is the radian, and the unit of H is the meters. B is the measurement point tilt angle sequence which includes all tilt angles recorded from the start of the measurement to the end of the measurement in chronological sequence. The tilt angles one-to-one correspond to the measurement points, which indicates that the coordinate of the measurement point is obtained together with the tilt angle and the unit of the tilt angle is radian. C is the length of the centering rod and the height of the antenna phase center, and the unit thereof is meter. D is the positioning quality threshold, which is also called the geometrical factor. The geometrical factor is a positive integer with a minimum value of 1. The value of the geometrical factor is smaller, the accuracy of the calculation result is higher. E is the geodetic coordinate of the to-be-measured point (the ground point), which is the result calculated by the program, and E includes the geodetic latitude B, the geodetic longitude L, and the geodetic height H. The unit of B and L is radian, and the unit of H is meter.

The step 2 specifically includes step S2a: observing and obtaining the geodetic coordinate ($B_i$, $L_i$, $H_i$) of the observation point and the measurement tilt angle $\theta_i$ and step S2b: converting the geodetic coordinate ($B_i$, $L_i$, $H_i$) of the observation point into the planar coordinate ($N_i$, $E_i$, $H_i$); and step S2c: obtaining the planar coordinate ($\hat{N}_0$, $\hat{E}_0$, $\hat{H}_0$) of the to-be-measured point on the ground based on the planar coordinate ($N_i$, $E_i$, $H_i$), and converting the planar coordinate ($\hat{N}_0$, $\hat{E}_0$, $\hat{H}_0$) into the geodetic coordinate ($\hat{B}_0$, $\hat{L}_0$, $\hat{H}_0$). Specifically, the step 2c includes establishing the observation equation, performing the indirect adjustment, performing the robust estimation according to the residual of the observation values after the indirect adjustment, and calculating the planar coordinate ($\hat{N}_0$, $\hat{E}_0$, $\hat{H}_0$) of the to-be-measured point on the ground.

Step S3: a positioning quality threshold and a geodetic coordinate of the to-be-measured point are obtained based on values obtained from the measurement.

Specifically, step 3 includes step S3a: establishing a first type of observation equation according to the principle of resection based on a position coordinate of the observation point and a distance between the observation point and the to-be-measured point. Specifically, assuming that the planar coordinate of the antenna phase center of the GPS receiver is ($N_i$, $E_i$); and the geodetic height is $H_i$ (wherein i is 1, 2..., n, n is the total number of observation points, the same below), and assuming that the planar coordinate and the geodetic height of the to-be-measured point O are ($\tilde{N}_0$, $\tilde{E}_0$) and $\tilde{H}_0$ respectively and the length from the to-be-measured point to the observation point is $\tilde{L}_i$, the observation equation is expressed by the following equation:

$$\tilde{L}_i = \sqrt{(N_i - \tilde{N}_0)^2 + (E_i - \tilde{E}_0)^2 + (H_i - \tilde{H}_0)^2} \quad (7)$$

the following equation is obtained after a linearization:

$$v_{L_i} = \frac{(N_0 - N_i)}{L_i^0} v_N + \frac{(E_0 - E_i)}{L_i^0} v_E + \frac{(H_0 - H_i)}{L_i^0} v_H - (L_i - L_i^0) \quad (8)$$

wherein $v_{L_i}$ is the length correction number, ($v_N$, $v_E$, $v_H$) is the coordinate correction number of the to-be-measured point, ($N_0$, $E_0$, $H_0$) is the approximate coordinate of the to-be-measured point, $L_i$ is the sum of the length of the centering rod and the height of the antenna, and $L_i^0$ is the distance calculated from the coordinate of the observation point and the approximate coordinate of the to-be-measured point.

Step 3 further includes step S3b: establishing a second type of observation equation according to a cosine relationship of an tilt angle of a height difference and a distance between the observation point and the to-be-measured point.

Specifically, step 3b includes assuming that the observation tilt angle of the observation point is $\theta_i$, the observation equation being expressed by the following equation:

$$\tilde{L}'_i = \tilde{H}_0 - H_i \quad (9)$$

wherein $\tilde{L}'_i = -\tilde{L}_i \cos \theta_i$, so the following equation can be obtained after operating based on the equations:

$$v_{L'} = v_H - (H_i - L_i \cos \theta_i - H_0) \quad (10)$$

combining the equation (2) and (4) to establish the error equation set:

$$V = BX - W, P \quad (11)$$

wherein $X = \begin{bmatrix} v_N \\ v_E \\ v_H \end{bmatrix}$;

$$B = \begin{bmatrix} \frac{N_0 - N_1}{L_1^0} & \frac{E_0 - E_1}{L_1^0} & \frac{H_0 - H_1}{L_1^0} \\ \frac{N_0 - N_2}{L_2^0} & \frac{E_0 - E_2}{L_2^0} & \frac{H_0 - H_2}{L_2^0} \\ \cdots & & \\ \frac{N_0 - N_n}{L_n^0} & \frac{E_0 - E_n}{L_n^0} & \frac{H_0 - H_n}{L_n^0} \\ 0 & 0 & 1 \\ 0 & 0 & 1 \\ \cdots & & \\ 0 & 0 & 1 \end{bmatrix};$$

$$W = \begin{bmatrix} L_1 - L_1^0 \\ L_2 - L_2^0 \\ \cdots \\ L_n - L_n^0 \\ H_1 - L_1 \cos\theta_1 - H_0 \\ H_2 - L_2 \cos\theta_2 - H_0 \\ \cdots \\ H_n - L_n \cos\theta_n - H_0 \end{bmatrix};$$

P is a weight matrix, which is set according to an accuracy of the observation values, if information of the accuracy of the observation values is not available, P can be set as a unit matrix.

obtaining the following equation according to the weighted least square criterion:

$$\hat{X}=(B^TPB)^{-1}B^TPW \quad (12)$$

finally calculating the planar position ($\hat{N}_0$, $\hat{E}_0$) of the to-be-measured point on the ground and the geodetic height $\hat{H}_0$ by loop iteration;

and assuming $$A = \begin{bmatrix} \frac{N_0 - N_1}{L_1^0} & \frac{E_0 - E_1}{L_1^0} & \frac{H_0 - H_1}{L_1^0} \\ \frac{N_0 - N_2}{L_2^0} & \frac{E_0 - E_2}{L_2^0} & \frac{H_0 - H_2}{L_2^0} \\ \cdots \\ \frac{N_0 - N_n}{L_n^0} & \frac{E_0 - E_n}{L_n^0} & \frac{H_0 - H_n}{L_n^0} \end{bmatrix}$$

wherein A is a coefficient matrix; calculating ATA to obtain a unit matrix with dimensions of 3 rows and 3 columns; and summing up the diagonal elements of the unit matrix, then calculating a square root of the summed value to obtain the quality threshold.

Step S4: whether the positioning quality threshold meets a requirement is determined by deciding whether or not to finish the measurement. If the requirement is not satisfied, step S1 to step S3 are performed. If the requirement is satisfied, the measurement is finished.

The operation process of the present invention: referring to FIG. 1 and FIG. 2, the calculation steps are as follows.

(1) The geodetic coordinate ($B_i$, $L_i$, $H_i$) and measurement tilt angle $\theta_i$ of all the observation points are obtained through observation.

(2) The geodetic coordinate ($B_i$, $L_i$, $H_i$) of the observation point is converted into the planar coordinate ($N_i$, $E_i$, $H_i$).

(3) The observation equation is established and the indirect adjustment is performed.

(4) The robust estimation is performed according to the residual of the observation values after the indirect adjustment, and the planar coordinate ($\hat{N}_0$, $\hat{E}_0$, $\hat{H}_0$) of the to-be-measured point on the ground is calculated.

(5) The planar coordinate ($\hat{N}_0$, $\hat{E}_0$, $\hat{H}_0$) of the to-be-measured point is converted into geodetic coordinate ($\hat{B}_0$, $\hat{L}_0$, $\hat{H}_0$).

(6) The converted geodetic coordinate and the quality threshold (which are also called "geometry factors") are output.

(7) Whether the accuracy meets the standard is judged according to the value of the quality threshold. If the accuracy meets the standard, the measurement is finished and the converted geodetic coordinate is output. If the accuracy does not meet the standard, go to process (1) and perform the measurement. The observation data of this time is added into all the observation points described in the process (1).

In step (6), the quality threshold (which is also called the "geometrical factor") is a positive integer with a minimum value of 1. The value of the quality threshold is smaller, the accuracy is higher.

During the measurement, the length of the centering rod in the use is fixed and cannot be changed, and the bottom of the centering rod cannot be moved. During the measurement, the receiver need to be shook, and the shaking is the larger extent, the effect is better.

Referring to FIG. 2, the calculation principle is as follows. O is the to-be-measured point on the ground. A is the antenna phase center of the GPS receiver, which is the observation point of the tilt measurement. AB is the antenna height. OB is the length of the centering rod. OD is the normal of the reference ellipsoid at the to-be-measured point. AC is the normal from the observation point A to the reference ellipsoid. In the plane-coordinate system after the projection, AC is parallel to OD. $\theta$ is the tilt angle of the apparatus.

The tilt measurement mainly includes two types of observation values i.e. the position and tilt angle, which correspond to the two types of observation equations, respectively.

The first type of observation equation is established according to the principle of resection based on the position coordinate of the observation point and the distance between the observation point and the to-be-measured point. Assuming that the planar coordinate of the antenna phase center of the GPS receiver is ($N_i$, $E_i$) and the geodetic height is $H_i$ (wherein i is 1, 2 ..., n, n is the total number of observation points, the same below), and assuming that the planar coordinate and the geodetic height of the to-be-measured point O are ($\tilde{N}_0$, $\tilde{E}_0$) and $\tilde{H}_0$ respectively and the length from the to-be-measured point to the observation point is $\tilde{L}_i$, the observation equation is expressed by the following equation:

$$\tilde{L}_i = \sqrt{(N_i - \tilde{N}_0)^2 + (E_i - \tilde{E}_0)^2 + (H_i - \tilde{H}_0)^2} \quad (13)$$

the following equation is obtained after a linearization:

$$v_{L_i} = \frac{(N_0 - N_i)}{L_i^0} v_N + \frac{(E_0 - E_i)}{L_i^0} v_E + \frac{(H_0 - H_i)}{L_i^0} v_H - (L_i - L_i^0) \quad (14)$$

wherein $V_{L_i}$ is the length correction number, ($v_N$, $v_E$, $v_H$) is the coordinate correction number of the to-be-measured point, ($N_0$, $E_0$, $H_0$) is the approximate coordinate of the to-be-measured point, $L_i$ is the sum of the length of the centering rod and the height of the antenna, and $L_i^0$ is the distance calculated from the coordinate of the observation point and the approximate coordinate of the to-be-measured point.

The second type of observation equation is established according to the cosine relationship of the tilt angle of the height difference and the distance between the observation point and the to-be-measured point. Assuming that the observation tilt angle of the observation point is $\hat{\theta}_i$, the observation equation is as follows:

$$\tilde{L}'_i = \tilde{H}_0 - H_i \quad (15)$$

wherein $\tilde{L}'_i = -\tilde{L}_i \cos \hat{\theta}_i$, so the following equation can be obtained after operating based on the equations:

$$v_L = v_H - (H_i - L_i \cos \theta_i - H_0) \quad (16)$$

The equation (2) and (4) are combined to establish the error equation set:

$$V = BX - W, P \quad (17)$$

$$\text{wherein } X = \begin{bmatrix} v_N \\ v_E \\ v_H \end{bmatrix};$$

-continued $$B = \begin{bmatrix} \frac{N_0 - N_1}{L_1^0} & \frac{E_0 - E_1}{L_1^0} & \frac{H_0 - H_1}{L_1^0} \\ \frac{N_0 - N_2}{L_2^0} & \frac{E_0 - E_2}{L_2^0} & \frac{H_0 - H_2}{L_2^0} \\ \cdots & & \\ \frac{N_0 - N_n}{L_n^0} & \frac{E_0 - E_n}{L_n^0} & \frac{H_0 - H_n}{L_n^0} \\ 0 & 0 & 1 \\ 0 & 0 & 1 \\ \cdots & & \\ 0 & 0 & 1 \end{bmatrix};$$

$$W = \begin{bmatrix} L_1 - L_1^0 \\ L_2 - L_2^0 \\ \cdots \\ L_n - L_n^0 \\ H_1 - L_1 \cos\theta_1 - H_0 \\ H_2 - L_2 \cos\theta_2 - H_0 \\ \cdots \\ H_n - L_n \cos\theta_n - H_0 \end{bmatrix};$$

P is the weight matrix, which is set according to the accuracy of the observation values. If information of the accuracy of the observation values is not available, P can be set as a unit matrix.

According to the weighted least squares criterion, the following equation can be obtained:

$$\hat{X} = (B^T P B)^{-1} B^T P W \qquad (18)$$

Finally, the plane position $(\hat{N}_O, \hat{E}_O)$ of the to-be-measured point on the ground and the geodetic height $\hat{H}_O$ are calculated by loop iteration.

Assuming $$A = \begin{bmatrix} \frac{N_0 - N_1}{L_1^0} & \frac{E_0 - E_1}{L_1^0} & \frac{H_0 - H_1}{L_1^0} \\ \frac{N_0 - N_2}{L_2^0} & \frac{E_0 - E_2}{L_2^0} & \frac{H_0 - H_2}{L_2^0} \\ \cdots & & \\ \frac{N_0 - N_n}{L_n^0} & \frac{E_0 - E_n}{L_n^0} & \frac{H_0 - H_n}{L_n^0} \end{bmatrix}$$

A is a coefficient matrix. ATA is calculated to obtain a unit matrix with dimensions of 3 rows and 3 columns. The diagonal elements of the unit matrix are summed up and a square root of the summed value is calculated to obtain the quality threshold, which is called the geometrical factor. The geometrical factor is used as the accuracy index. The geometrical factor is smaller, the accuracy is higher.

The method of the present invention can realize the following aspects.

1. Merely the RTK measuring receiver with the information of tilt angle is required, so the cost for the additional hardware is not needed.

3. Compared with the traditional tilt measurement module that measures the attitude angle information of the receiver, the method of the present invention is not affected by any external environment factors (such as magnetic interference, temperature change, etc.).

4. Compared with the traditional tilt measurement method, the calibration of magnetic field is not required.

5. Compared with the traditional tilt measurement method, the measurement accuracy of the bottom position of the centering rod depends on the robustness of the geometric structure of the observation point, the number and accuracy of the observation points, the accuracy of the tilt angle measurement, the length error of the centering rod, and the length error of the antenna phase center. The measurement results are more stable and the measurement accuracy is higher.

6. Compared with the traditional tilt measurement method, the stability of the receiver during the measurement in nonrestrictive, and the receiver can be shaken arbitrarily as long as the bottom is fixed.

7. Compared with the traditional tilt measurement method, the threshold value of the measurement accuracy can be set. When the accuracy meets the standard, increasing the threshold value of the geometric factor can shorten the measurement time.

The preferred embodiment of the present invention has been described above. It should be understood that the present invention is not limited to the specific embodiments described above. Devices and structures that are not described in detail herein should be understood as being implemented in a common manner known in the art. Various possible changes and modifications or equivalent embodiments obtained by equivalent substitutions may be derived from the technical solution of the present invention according to the method and technical features recited above without departing from the technical solution of the present invention by any skilled person in the art, which do not have any impact on the essence of the present invention. Therefore, any simple modification, equivalent substitution and modification made based upon the above embodiment according to the technical essence of the present invention without departing from the content of the technical solution of the present invention, and should still be considered as falling within the scope of the technical solution of the present invention.

What is claimed is:

1. A tilt measurement method for a Real Time Kinematic (RTK) measuring receiver, comprising the following steps:
    S1: fixing a bottom of a centering rod and performing a measurement after an inclination and shake;
    S2: obtaining a measurement point sequence, obtaining a measurement point tilt sequence, obtaining a length of the centering rod, and obtaining a height of an antenna phase center, where the height of the antenna phased center is based on the measurement;
    S3: obtaining a positioning quality threshold and obtaining a geodetic coordinate of a to-be-measured point based on values obtained from the measurement;
    S4: determining whether the positioning quality threshold meets a requirement or not to decide whether to finish the measurement or not,
    wherein the step of S3 comprises:
    S3a: establishing a first type of observation equation according to a principle of resection based on a position coordinate of an observation point and a distance between the observation point and the to-be-measured point:
    S3b: establishing a second type of observation equation according to a cosine relationship of a tilt angle of a height difference and a distance between the observation point and the to-be-measured point, and
    wherein in the step of S3a,
    assuming that a planar coordinate of the antenna phase center of a receiver is $(N_i, E_i)$ and a geodetic height is $H_i$ (wherein, i is 1, 2 ..., n, n is a total number of observation points, the same below), and assuming that a planar coordinate and the geodetic height of the to-be-measured point O are ($\tilde{N}_0$, $\tilde{E}_0$ and $\tilde{H}_0$ respectively and a length from the to-be-measured point to the observation point is $\tilde{L}_i$, the first type of observation equation is expressed by an equation (1):

$$\tilde{L}_i = \sqrt{(N_i-\tilde{N}_0)^2+(E_i-\tilde{E}_0)^2+(H_i-\tilde{H}_0)^2} \quad (1)$$

an equation (2) is obtained after a linearization:

$$v_{L_i} = \frac{(N_0-N_i)}{L_i^0}v_N + \frac{(E_0-E_i)}{L_i^0}v_E + \frac{(H_0-H_i)}{L_i^0}v_H - (L_i - L_i^0) \quad (2)$$

wherein $v_{L_i}$ is a length correction number; ($v_N$, $v_E$, $v_H$) is a coordinate correction number of the to-be-measured point, ($N_0$, $E_0$, $H_0$) is an approximate coordinate of the to-be-measured point, $L_i$ is a sum of a length of the centering rod and a height of an antenna: $L_i^0$ is a distance calculated from the coordinate of the observation point and the approximate coordinate of the to-be-measured point.

2. The tilt measurement method for the RTK measuring receiver according to claim 1, wherein the step of S1 comprises:

during the measurement, keeping the length of the centering rod unchanged while in use, and keeping the bottom of the centering rod fixed.

3. The tilt measurement method for the RTK measuring receiver according to claim 2, wherein the step of S4 comprises:

performing the step of S1 through the step of S3 if the positioning quality threshold does not meet the requirement; and when the positioning quality threshold meets the requirement, finishing the measurement.

4. The tilt measurement method for the RTK measuring receiver according to claim 2, wherein in the step of S3b, assuming that an observation tilt angle of the observation point is $\hat{\theta}_i$, the second type of observation equation is expressed by an equation (11):

$$\tilde{L}'_i = \hat{H}_0 - H_i \quad (11)$$

wherein $\tilde{L}'_i = \tilde{L}_i \cos \theta_i$, so an equation (12) can be obtained after operating based on the equation (11):

$$v_{L_i} = v_{H} - (H_i - L_i \cos \theta_i - H_0) \quad (12)$$

combining the equation (8) and the equation (12) to establish an error equation set (13):

$$V = BX - WP \quad (13)$$

wherein, $X = \begin{bmatrix} v_N \\ v_E \\ v_H \end{bmatrix}$;

$$B = \begin{bmatrix} \frac{N_0-N_1}{L_1^0} & \frac{E_0-E_1}{L_1^0} & \frac{H_0-H_1}{L_1^0} \\ \frac{N_0-N_2}{L_2^0} & \frac{E_0-E_2}{L_2^0} & \frac{H_0-H_2}{L_2^0} \\ \cdots \\ \frac{N_0-N_n}{L_n^0} & \frac{E_0-E_n}{L_n^0} & \frac{H_0-H_n}{L_n^0} \\ 0 & 0 & 1 \\ 0 & 0 & 1 \\ \cdots \\ 0 & 0 & 1 \end{bmatrix};$$

$$W = \begin{bmatrix} L_1 - L_1^0 \\ L_2 - L_2^0 \\ \cdots \\ L_n - L_n^0 \\ H_1 - L_1 \cos\theta_1 - H_0 \\ H_2 - L_2 \cos\theta_2 - H_0 \\ \cdots \\ H_n - L_n \cos\theta_n - H_0 \end{bmatrix};$$

P is a weight matrix, wherein P is set according to an accuracy of the observation values, if information of the accuracy of the observation values is not available, P is set as a unit matrix.

5. The tilt measurement method for the RTK measuring receiver according to claim 4, wherein the method comprises the following steps: obtaining an equation (17) according to a weighted least square criterion:

$$\hat{X} = (B^T PB)^{-1} B^T PW \quad (17)$$

finally calculating a planar position ($\hat{N}_0$, $\hat{E}_0$) of the to-be-measured point on the ground and a geodetic height $\hat{H}_0$ through a loop iteration;

and assuming $$A = \begin{bmatrix} \frac{N_0-N_1}{L_1^0} & \frac{E_0-E_1}{L_1^0} & \frac{H_0-H_1}{L_1^0} \\ \frac{N_0-N_2}{L_2^0} & \frac{E_0-E_2}{L_2^0} & \frac{H_0-H_2}{L_2^0} \\ \cdots \\ \frac{N_0-N_n}{L_n^0} & \frac{E_0-E_n}{L_n^0} & \frac{H_0-H_n}{L_n^0} \end{bmatrix}$$

wherein A is a coefficient matrix;

calculating ATA to obtain a unit matrix with dimensions of 3 rows and 3 columns; and summing up the diagonal elements of the unit matrix, then calculating a square root of a summed value of the diagonal elements of the unit matrix to obtain the quality threshold.

6. The tilt measurement method for the RTK measuring receiver according to claim 1, wherein the step of S2 comprises:

S2a: observing and obtaining a geodetic coordinate ($B_i$, $L_i$, $H_i$) of an observation point and a measurement tilt angle $\theta_i$;

S2b: converting the geodetic coordinate ($B_i$, $L_i$, $H_i$) of the observation point into a planar coordinate ($N_i$, $E_i$, $H_i$);

S2c: obtaining a planar coordinate ($\hat{N}_0$, $\hat{E}_0$, $\hat{H}_0$) of the to-be-measured point on a ground based on the planar coordinate ($N_i$, $E_i$, $H_i$), and converting the planar coordinate ($\hat{N}_0$, $\hat{E}_0$, $\hat{H}_0$) into a geodetic coordinate ($\hat{B}_0$, $\hat{L}_0$, $\hat{H}_0$).

7. The tilt measurement method for the RTK measuring receiver according to claim 6, wherein the step of S4 comprises:
performing the step of S1 through the step of S3 if the positioning quality threshold does not meet the requirement; and when the positioning quality threshold meets the requirement, finishing the measurement.

8. The tilt measurement method for the RTK measuring receiver according to claim 6, wherein the step of S2c comprises:
establishing an observation equation and performing an indirect adjustment;
performing a robust estimation according to a residual of observation values after the indirect adjustment and calculating the planar coordinate ($\hat{N}_0$, $\hat{E}_0$, $\hat{H}_0$) of the to-be-measured point on the ground.

9. The tilt measurement method for the RTK measuring receiver according to claim 6, wherein in the step of S3b, assuming that an observation tilt angle of the observation point is $\tilde{\theta}_i$, the second type of observation equation is expressed by an equation (14):

$$\tilde{L}'_i = \tilde{H}_0 - H_i \qquad (14)$$

wherein $\tilde{L}'_i = -\tilde{L}_i \cos \tilde{\theta}_i$, so an equation (15) can be obtained after operating based on the equation (3):

$$v_{L_i} = v_{H_i} - (H_i - L_i \cos \theta_i - H_0) \qquad (15)$$

combining the equation (10) and the equation (15) to establish an error equation set (16):

$$V = BX - WP \qquad (16)$$

$$\text{wherein, } X = \begin{bmatrix} V_N \\ V_E \\ V_H \end{bmatrix};$$

$$B = \begin{bmatrix} \frac{N_0 - N_1}{L_1^0} & \frac{E_0 - E_1}{L_1^0} & \frac{H_0 - H_1}{L_1^0} \\ \frac{N_0 - N_2}{L_2^0} & \frac{E_0 - E_2}{L_2^0} & \frac{H_0 - H_2}{L_2^0} \\ \cdots \\ \frac{N_0 - N_n}{L_n^0} & \frac{E_0 - E_n}{L_n^0} & \frac{H_0 - H_n}{L_n^0} \\ 0 & 0 & 1 \\ 0 & 0 & 1 \\ \cdots \\ 0 & 0 & 1 \end{bmatrix};$$

$$W = \begin{bmatrix} L_1 - L_1^0 \\ L_2 - L_2^0 \\ \cdots \\ L_n - L_n^0 \\ H_1 - L_1 \cos\theta_1 - H_0 \\ H_2 - L_2 \cos\theta_2 - H_0 \\ \cdots \\ H_n - L_n \cos\theta_n - H_0 \end{bmatrix};$$

P is a weight matrix, wherein P is set according to an accuracy of the observation values, if information of the accuracy of the observation values is not available, P is set as a unit matrix.

10. The tilt measurement method for the RTK measuring receiver according to claim 9, wherein the method comprises the following steps: obtaining an equation (18) according to a weighted least square criterion:

$$\hat{X} = (B^T P B)^{-1} B^T P W \qquad (18)$$

finally calculating a planar position ($\hat{N}_0$, $\hat{E}_0$) of the to-be-measured point on the ground and a geodetic height $\hat{H}_0$ through a loop iteration;
and assuming $$A = \begin{bmatrix} \frac{N_0 - N_1}{L_1^0} & \frac{E_0 - E_1}{L_1^0} & \frac{H_0 - H_1}{L_1^0} \\ \frac{N_0 - N_2}{L_2^0} & \frac{E_0 - E_2}{L_2^0} & \frac{H_0 - H_2}{L_2^0} \\ \cdots \\ \frac{N_0 - N_n}{L_n^0} & \frac{E_0 - E_n}{L_n^0} & \frac{H_0 - H_n}{L_n^0} \end{bmatrix}$$

wherein A is a coefficient matrix;
calculating ATA to obtain a unit matrix with dimensions of 3 rows and 3 columns; and summing up the diagonal elements of the unit matrix, then calculating a square root of a summed value of the diagonal elements of the unit matrix to obtain the quality threshold.

11. The tilt measurement method for the RTK measuring receiver according to claim 1, wherein the step of S4 comprises:
performing the step of S1 through the step of S3 if the positioning quality threshold does not meet the requirement; and when the positioning quality threshold meets the requirement, finishing the measurement.

12. The tilt measurement method for the RTK measuring receiver according to claim 1, wherein in the step of S3b,
assuming that an observation tilt angle of the observation point is $\hat{\theta}_i$, the second type of observation equation is expressed by an equation (3):

$$\hat{L}'_i = \tilde{H}_0 - H_i \qquad (3)$$

wherein $\tilde{L}'_i = -\tilde{L}_i \cos \tilde{\theta}_i$, so an equation (4) can be obtained after operating based on the equation (3):

$$v_{L_i} = v_{H_i} - (H_i - L_i \cos \theta_i - H_0) \qquad (4)$$

combining the equation (2) and the equation (4) to establish an error equation set (5):

$$V = BX - WP \qquad (5)$$

$$\text{wherein, } X = \begin{bmatrix} V_N \\ V_E \\ V_H \end{bmatrix};$$

-continued $$B = \begin{bmatrix} \frac{N_0-N_1}{L_1^0} & \frac{E_0-E_1}{L_1^0} & \frac{H_0-H_1}{L_1^0} \\ \frac{N_0-N_2}{L_2^0} & \frac{E_0-E_2}{L_2^0} & \frac{H_0-H_2}{L_2^0} \\ \cdots & & \\ \frac{N_0-N_n}{L_n^0} & \frac{E_0-E_n}{L_n^0} & \frac{H_0-H_n}{L_n^0} \\ 0 & 0 & 1 \\ 0 & 0 & 1 \\ \cdots & & \\ 0 & 0 & 1 \end{bmatrix};$$

$$W = \begin{bmatrix} L_1 - L_1^0 \\ L_2 - L_2^0 \\ \cdots \\ L_n - L_n^0 \\ H_1 - L_1\cos\theta_1 - H_0 \\ H_2 - L_2\cos\theta_2 - H_0 \\ \cdots \\ H_n - L_n\cos\theta_n - H_0 \end{bmatrix};$$

P is a weight matrix, wherein P is set according to an accuracy of the observation values, if information of the accuracy of the observation values is not available, P is set as a unit matrix.

13. The tilt measurement method for the RTK measuring receiver according to claim 12, wherein the method comprises the following steps: obtaining an equation (6) according to a weighted least square criterion:

$$\hat{X} = (B^T P B)^{-1} B^T P W \tag{6}$$

finally calculating a planar position ($\hat{N}_0$, $\hat{E}_0$) of the to-be-measured point on the ground and a geodetic height $\hat{H}_0$ through a loop iteration;

and assuming $$A = \begin{bmatrix} \frac{N_0-N_1}{L_1^0} & \frac{E_0-E_1}{L_1^0} & \frac{H_0-H_1}{L_1^0} \\ \frac{N_0-N_2}{L_2^0} & \frac{E_0-E_2}{L_2^0} & \frac{H_0-H_2}{L_2^0} \\ \cdots & & \\ \frac{N_0-N_n}{L_n^0} & \frac{E_0-E_n}{L_n^0} & \frac{H_0-H_n}{L_n^0} \end{bmatrix}$$

wherein A is a coefficient matrix;

calculating ATA to obtain a unit matrix with dimensions of 3 rows and 3 columns; and summing up diagonal elements of the unit matrix, then calculating a square root of a summed value of the diagonal elements of the unit matrix to obtain the quality threshold.

\* \* \* \* \*